United States Patent [19]

Nury et al.

[11] Patent Number: 4,808,670

[45] Date of Patent: Feb. 28, 1989

[54] PROCESS FOR CROSS-LINKING OF COPOLYMERS COMPRISING ETHYLENE AND A HYDROXYALKYL ESTER

[75] Inventors: Jacques Nury, Pau; Serge Nawrot, Beaumont-Le-Roger, both of France

[73] Assignee: Atochem, France

[21] Appl. No.: 38,429

[22] Filed: Apr. 14, 1987

Related U.S. Application Data

[63] Continuation of Ser. No. 784,270, Oct. 4, 1985, abandoned.

[30] Foreign Application Priority Data

Oct. 10, 1984 [FR] France .............................. 84 15629

[51] Int. Cl.$^4$ ................................................ C08F 8/42
[52] U.S. Cl. ................................... 525/370; 525/378.8
[58] Field of Search ........................................ 525/370

[56] References Cited

U.S. PATENT DOCUMENTS

| | | | |
|---|---|---|---|
| 3,769,254 | 10/1973 | Anderson et al. | 525/370 |
| 3,904,572 | 9/1975 | Huang et al. | 524/319 |
| 3,914,208 | 10/1975 | Carlos et al. | 525/370 |
| 4,185,051 | 1/1980 | McKenna, Jr. et al. | 525/370 |
| 4,351,926 | 9/1982 | Keogh | 525/370 |
| 4,354,008 | 10/1982 | Skoultchi | 525/370 |
| 4,389,514 | 6/1983 | Schmidle et al. | 525/370 |

*Primary Examiner*—Joseph L. Schofer
*Assistant Examiner*—Bernard Lipman
*Attorney, Agent, or Firm*—Sigalos, Levine & Montgomery

[57] ABSTRACT

The process of making cross-linked copolymers comprising ethylene and a hydroxyalkyl monomer comprising contacting the copolymer with an organometallic compound of a metal of Group IVA or IVB of the Periodic Table for a time and at a temperature sufficient to effect cross-linking.

8 Claims, No Drawings

PROCESS FOR CROSS-LINKING OF COPOLYMERS COMPRISING ETHYLENE AND A HYDROXYALKYL ESTER

This application is a continuation of application Ser. No. 784,270, filed Oct. 4, 1985, now abandoned.

BACKGROUND OF THE INVENTION

The present invention concerns a procedure for the cross-linking of an ethylene copolymer and a polymerizable hydroxylated ester.

These copolymers of ethylene and of a hydroxylated ester, described for instance in U.S. Pat. No. 3,300,452, are of limited use because of the difficulty in cross-linking them. Although when these polymers are heated to temperatures between 170° C. and 340° C., their thermoplasticity is reduced and their tensile strength and their apparent molecular weight are increased, this high-temperature treatment, in any case very long, practically never leads to a complete cross-linking nor even a satisfactory one.

SUMMARY OF THE INVENTION

The present invention permits a rapid, low temperature process for such cross-linking.

Briefly, the process comprises admixing an organometallic compound of a metal of Group IVA or IVB of the Periodic Table with a copolymer comprising ethylene and a hydroxylated ester for a time and at a temperature sufficient to effect cross-linking.

More particularly the metals used are lead, tin, or titanium and the temperature used ranges from ambient to 300° C.

DETAILED DESCRIPTION

The ethylene/hydroxyalkyl ester copolymers, objects of the treatment according to the invention, result from the copolymerization of about 60 percent to 99.5 percent by weight of ethylene or of a mixture of ethylene with another polymerizable ethylenicly unsaturated monomer and of about 0.5 percent to about 40 percent by weight of a hydroxyalkyl ester of an alpha, beta ethylenicly unsaturated acid of the formula:

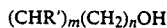

in which
(i) R is hydrogen or a methyl group;
(ii) X is a group —COO(CHR')$_m$(CH$_2$)$_n$—OH;
(iii) m is a whole number from 0 to 5;
(iv) n is a whole number from 1 to 6 with m and n being a number from 2 to 6;
(v) R' is a hydrogen or unsubstituted or halogenated hydrocarbon radical; and
(vi) Y is hydrogen X or —COO—CH$_2$—R'; X and R being defined as above.

In the usual manner, R' includes hydrogen and organic radicals containing up to 8 atoms of carbon, without however excluding those containing a greater number of carbon atoms, if desired. Among these radicals are methyl, ethyl, propyl, butyl, 2-ethylhexyl, cyclohexyl, phenyl, tolyl, ethylphenyl as well as these same radicals possessing at least one substituted halogen, more particularly chlorine.

As used herein, the term "hydroxyalkyl ester" means the ester possessing the hydroxyalkyl group

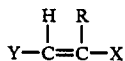

R', m, and n being defined as previously.

The hydroxyalkyl esters of ethylenicly unsaturated acids include the hydroxyalkylated esters of monocarboxylic and dicarboxylic acids such as acrylic acid, alpha substituted acids, more particularly methacrylic acid, maleic acid and fumaric acid.

As polymerizable ethylenicly unsaturated monomers which can be associated with the ethylene up to a ratio by weight of 1/1, can be selected for instance from among the alpha olefins; aromatic compounds such as the styrenes; alkyl acrylates such as ethyl acrylate, n-butyl acrylate, and 2-ethylhexyl acrylate; alkyl methacrylates; acrylic and methacrylic nitriles; maleic esters such as diethyl maleate; fumaric esters; and esters of unsaturated alcohols such as vinyl acetate.

According to the object of the invention, these copolymers, prepared for instance according to the technique described in U.S. Pat. No. 3,300,452 already cited, are cross-linked by reaction with an organometallic compound; preferably of lead, tin, or titanium. These organometallic compounds are favorably selected from among salts of organic acids and more particularly from among the salts of organic acids containing up to 25 carbon atoms in their molecule and better still up to 20 atoms, organometallic compounds of low molecular weight or easily migrating, such as for instance liquid compounds, being the best adapted, one of their characteristics being an easier and more homogeneous distribution in the copolymer.

Among the organometallic compounds of lead and of tin which are more particularly suitable are the salts of acids of $C_2$ to $C_{13}$ such as dibutyltin diacetate and dibutyltin dilaurate, lead octoate, lead and tin stearates; the mercaptides such as alkyltin thioglycolates and the alkyltin mercaptoacetates; the sulfides like alkylated tin sulfides; the carboxylates.

Among the compounds of titanium, particularly recommended are the compounds of the general formula Ti(OR$_2$)$_4$, in which the radicals R, identical or different, represent hydrogen or a hydrocarbon radical, containing from 1 to 18 and, better still, from 1 to 14 carbon atoms. These radicals R preferably are: alkyl, aryl, alkylaryl, or cycloaliphatic groups.

Quantities of from 0.05 to 5 percent by weight or organometallic compound with respect to the ethylene/hydroxyalkyl ester copolymer are perfectly suitable for the complete cross-linking of the copolymer at temperatures generally between the ambient temperature, about 20° C., and 300° C. This cross-linking procedure is particularly adapted to copolymers based on ethylene, including in mixture with at least one other polymerizable ethylenicly unsaturated monomer such as, for instance, vinyl acetate or ethyl acrylate, and hydroxyalkyl acrylate or methacrylate. As in the general case, these copolymers can contain from 0.5 to 40 percent by weight of polymerization product of hydroxylated acrylate or methacrylate.

The cross-linking reaction takes place during the course of conversion of the copolymer, but it can likewise take place after conversion of the copolymer. This signifies that the time the organometallic compound is placed in contact with the copolymer matters little. A preferred method consists of mixing together the copolymer and the organometallic compound at a temperature preferably between the ambient temperature and 300° C., and better still at the temperature near that of softening of the copolymer, any other means of placement into contact is not excluded. In particular, it can be advantageous to previously form the copolymer, then, in order to proceed with the cross-linking, to place the material obtained into contact with the organometallic compound by any suitable means, including for instance letting the material stay for a sufficient length of time in a solution or an emulsion containing the organometallic compound.

It goes without saying that the cross-linked ethylene/hydroxyalkyl ester copolymer can be prepared in situ by grafting at an elevated temperature, in a blender or mixer, the ester onto an ethylene polymer or copolymer, in the presence of a catalyst like an organic peroxide, then after a certain length of time introducing the organometallic compound during the course of mixing.

In the following examples development of the cross-linking is noted either by the variations in the mixing torque, or by measurement of the degree of gelation (gel ratio) during 24 hours of refluxing in xylene. In the latter case, the insoluble material is dried in the vacuum of several hundred Pascals at about 110° C. until constant weight is obtained, with the gel ratio being expressed in percent by weight of insoluble material.

Some results are likewise expressed from hot set tests.

The invention will be further described in connection with the following exmaples which are set forth for purposes of illustration only.

EXAMPLE 1

A film of 50 micron thickness of a copolymer of ethylene and hydroxyethyl acrylate at 7% by weight, having a melt index (MI) of 4 is prepared by extrusion blow molding at 150° C. The film is free of unmolten material. The film is left for 8 hours at 100° C. in an emulsion of 0.5% by weight of dibutyltin dilaurate in water likewise containing 0.1% of alkyl-aryl-polyethylene glycol (Antarox) as surfactant.

The gel ratio is then measured and compared to the gel ratio of an identical untreated film and another identical film treated under the same conditions but in an emulsion not containing dibutyltin dilaurate (DBTL).

|  | Gel ratio |
|---|---|
| Untreated film | 0 |
| Film treated without DBTL | 0 |
| Film treated with DBTL | 43.3 |

EXAMPLE 2

By mixing a copolymer of ethylene and hydroxyethyl acrylate at 2% by weight and respectively 1.0% and 2% by weight of DBTL at 140° C. for 10 min in a BRABENDER blender of type W50-EC, we prepare mixtures A and B.

By compression under 250 bars at 130° C., we prepare plates of 1 mm thickness which are kept in a drying oven at 100° C. for 8 hours. For the sake of comparison the same test is carried out with the copolymer free of DBTL.

The measurement of the gel ratio gives the following results:

|  | Gel ratio |
|---|---|
| Comparative test | 0 |
| Test A | 24.1 |
| Test B | 36.6 |

EXAMPLE 3

99.5% weight of a copolymer of ethylene and hydroxyethyl acrylate at 7% by weight, having a melt index (MI) of 3.5 and 0.5% of DBTL, are mixed under nitrogen in the BRABENDER blender of Example 2 at 50 RPM. Comparative tests are carried out in the absence of DBTL.

The mixing at 240° C. was carried out in the presence of 0.6% of DBTL.

The variations of the torque Nxm of mixing at different temperatures are given in the table below.

| Variation of the mixing torque (Nxm) at t° C. ↓ | → | Time in min of mixing |  |  |  |  |  |  |  |  |  |  |  |  |
|---|---|---|---|---|---|---|---|---|---|---|---|---|---|---|
|  |  | 1 | 5 | 6 | 10 | 12 | 14 | 15 | 16 | 18 | 20 | 25 | 30 | 35 | 40 |
| 160° C. | Introduction DBTL at 6 min | 8.1 | — | 6.3 | 6.7 | — | — | 7.4 | — | — | 8.3 | — | — | — | — |
|  | control | 8.1 | — | 6.3 | 6.4 | — | — | 6.4 | — | — | 6.4 | — | — | — | — |
| 180° C. | Introduction DBTL at 6 min | 6.9 | — | 5.4 | 5.7 | — | — | 6.6 | — | — | 7.8 | 9 | — | — | — |
|  | control | 6.9 | — | 5.4 | 5.5 | — | — | 5.5 | — | — | 5.5 | — | — | — | — |
| 200° C. | Introduction DBTL at 20 min | 6 | 4.5 | — | 4.5 | — | — | 5.4 | — | — | 6.6 | 9 | 10.5 | 12 | 13 |
|  | control | 6 | 4.5 | — | 4.5 | — | — | 5.4 | — | — | 6.6 | 6.8 | 7.0 | 7.2 | 7.4 |
| 240° C. | Introduction DBTL at 10 min | 3.3 | — | — | 4.5 | 12 | 17.4 | — | 4 | 1.5 | (complete dusting) |  |  |  |  |
|  | control | 3.3 | — | — | 4.5 | 5.1 | 5.4 | — | 6.1 | 6.8 |  |  |  |  | 9.4 |

EXAMPLE 4

In a BRABENDER blender identical to the one of Example 2, the following are mixed for 10 min at 50 RPM and at 130° C.

|  | Parts by Wt. Test A | Parts by Wt. Test B |
|---|---|---|
| Copolymer of ethylene and hydroxyethyl acrylate at 7% by weight | 99.3 | 98.8 |
| Dibutyltin dilaurate (DBTL) | 0.5 | 1.0 |
| Antioxidant (Irganox 1010) | 0.2 | 0.2 |

Starting from these mixtures, as well as from a mixture not containing DBTL, plates of 1 mm thickness are prepared at 160° C. under a pressure of 250 bars. These plates kept between reinforcing plates are raised to 200° C. for an hour in order to effect cross-linking thermally. The control plate does not exhibit any mechanical holding.

In the cooled plates obtained from tests A and B we cut out sample specimens of the dumbbell type, from which weights are suspended giving a load of 2 kg/cm². They are placed into a ventilated drying oven at 150° C. for 75 min.

The elongation measured as a function of time is given in the following table:

| Time in min. | Test A | Test B |
|---|---|---|
| 5 | 127% | 64% |
| 10 | 133% | 67% |
| 15 | 134% | 67% |
| 75 | 145% | 67% |

EXAMPLE 5

We mix the following nitrogen in the BRABENDER of Example 2 at 50 RPM: 99% by weight of the copolymer of ethylene and hydroxyethyl acrylate at 2.5% by weight and 1% of DBTL introduced at time t=0 of the mixing process. The copolymer without DBTL is mixed under the same conditions.

The variations of the torque Nxm of mixing at different temperatures are given in the following table:

| Variation of the mixing torque (Nxm) at t° C. ↓ | → | 0 | 6 | 10 | 20 | 30 | 40 | 50 | 60 |
|---|---|---|---|---|---|---|---|---|---|
| 200° C. | Test | 5.07 | 7.25 | 7.70 | 7.80 | 10.35 | 12.25 | 13.70 | 15.35 |
|  | Control | 5.07 | — | — | — | — | — | — | 5.20 |
| 200° C. | Test | 4.40 | 8.20 | 8.65 | 10.85 | 13.70 | 16.15 | 17.80 | 18.40 |
|  | Control | 4.40 | — | — | — | — | — | — | 4.50 |
| 240° C. | Test | 3.65 | 10.45 | 11.95 | 16.75 | 15.00 | dusting |  |  |
|  | Control | 3.65 | — | — | — | 3.70 |  |  |  |

EXAMPLE 6

The procedure of Example 5 was followed except that the DBTL was replaced with dibutyltin diacetate (DBTDA).

The results obtained are the following:

| Variation of the mixing torque (Nxm) at t° C. ↓ | → | 0 | 6 | 10 | 20 | 30 | 40 | 50 | 60 |
|---|---|---|---|---|---|---|---|---|---|
| 200° C. | Test | 4.55 | 9.45 | 9.40 | 11.80 | 14.15 | 15.55 | 15.70 | 15.60* |
|  | Control | 4.55 | — | — | — | — | — | — | 4.60 |
| 200° C. | Test | 3.25 | 10.40 | 11.40 | 15.00 | 16.05 | — | — | — |
|  | Control | 3.25 | — | — | — | 4.25 | — | — | — |
| 240° C. | Test | 3.25 | 12.80 | dusting |  |  |  |  |  |
|  | Control | 3.25 | — | — | 3.25 |  |  |  |  |

*The product comes out of the test container

EXAMPLE 7

The procedure of Example 5 was followed except that the DBTL was replaced with 1% of stannous octoate and adding 0.2% of antioxidant (Santonox R).

The results obtained are the following:

| Variation of the mixing torque (Nxm) at t° C. ↓ | → | 0 | 6 | 10 | 20 | 30 | 40 | 50 | 60 |
|---|---|---|---|---|---|---|---|---|---|
| 200° C. | Test | 4.25 | 5.45 | 6.10 | 6.45 | 7.80 | 8.65 | 9.70 | 10.45 |
|  | Control | 4.2 | — | — | — | — | — | — | 4.3 |

EXAMPLE 8

We mix the following under nitrogen in the BRABENDER blender of Example 2 at 50 RPM: 98.8% by weight of the copolymer of ethylene and hydroxyethyl acrylate at 15% by weight, 1% of DBTL and 0.2% of antioxidant (Santonox R). A control without DBTL is prepared under the same conditions.

The results obtained are the following:

| Variation of the mixing torque (Nxm) at t° C. ↓ | → | Time in min of mixing | | | | | | | | |
|---|---|---|---|---|---|---|---|---|---|---|
| | | 0 | 6 | 10 | 14 | 20 | 30 | 40 | 50 | 60 |
| 130° C. | Test | 4.80 | 4.60 | 4.60 | 4.75 | 5.10 | 7.65 | 8.35 | 8.60 | 9.35 |
| | Control | 4.80 | — | — | — | — | — | — | — | 4.80 |
| 220° C. | Test | 4.05 | 10.55 | dusting | | | | | | |
| | Control | 4.05 | 4.15 | | | | | | | |

EXAMPLE 9

We mix the following under nitrogen in the BRABENDER blender of Example 2 at 50 RPM and at 200° C.: a copolymer of ethylene and hydroxyethyl acrylate at 5.5% by weight with 2% dibasic lead stearate (test 1), 9.5% of tin maleate (test 2), and 1% of tin maleate (test 3) with respect to the weight of each of the mixtures.

The results obtained are the following:

| Variation of the Mixing Torque (Nxm) at 200° C. | Time, in min, of mixing | | | | | | |
|---|---|---|---|---|---|---|---|
| | 0 | 0.5 | 1 | 2 | 3 | 4 | 7 |
| Test 1 | 6.2 | 7.6 | 11.4 | 12.5 | 12.8 | 12.9 | Dusting |
| Test 2 | 6.0 | 9.0 | 10.5 | 12.0 | 12.7 | 12.8 | Dusting |
| Test 3 | 6.1 | 11.0 | 13.4 | Dusting | | | |
| Control | 6.1 | — | — | — | 6.1 | | |

EXAMPLE 10

In the BRABENDER blender of Example 2, the following are mixed for 15 minutes at 130° C. at a rate of 50 RPM:

| | Parts by Weight | |
|---|---|---|
| | Test 1 | Test 2 |
| Copolymer of ethylene and hydroxyethyl acrylate at 10% by weight | 98.8 | — |
| Copolymer of ethylene and hydroxyethyl acrylate at 15% by weight | — | 98.8 |
| DBTL | 1.0 | 1.0 |
| Antioxidant (Santonox R) | 0.2 | 0.2 |

From each of these two mixtures, as well as from the control mixtures not containing DBTL, plates of 1 mm thickness are prepared at 130° C. for 5 minutes under a pressure of 15 metric tons. These plates kept between reinforcing plates are raised to 200° C. for 30 minutes in order to achieve cross-linking thermally.

The gel ratios are then measured on each sample.

| | Gel ratio | |
|---|---|---|
| | 130° C. | 200° C. |
| Controls | 0 | 0 |
| Test 1 | 0 | 70 |
| Test 2 | 0 | 87 |

EXAMPLE 11

The following mixtures are mixed under the conditions of Example 10:

| | Test 1 | Test 2 | Test 3 | Controls 1 | Controls 2 |
|---|---|---|---|---|---|
| Copolymer of ethylene and hydroxyethylacrylate at 10% by weight | 98.8 | 98.8 | — | 99.8 | — |
| Terpolymer of ethylene and hydroxyethyl acrylate at 5% and ethyl acrylate at 10% by weight | — | — | 98.8 | — | 99.8 |
| DBTL | 1.0 | — | — | — | — |
| Dibutyltin diacetate | — | 1.0 | 1.0 | — | — |
| Antioxidant (Santonox R) | 0.2 | 0.2 | 0.2 | 0.2 | 0.2 |

Under the conditions of Example 10, plates are prepared which are kept in a drying oven at 100° C. for 8 hours in order to effect cross-linking thermally.

The gel ratios finally measured are given below.

| | Gel ratio | |
|---|---|---|
| | 5 min at 130° C. | 8 h at 100° C. |
| Controls 1 and 2 | 0 | 0 |
| Test 1 | 0 | 37 |
| Test 2 | 0 | 71 |
| Test 3 | 26 | 71 |

EXAMPLE 12

The following mixtures are mixed under nitrogen in a BRABENDER blender of type W50 EC at 50 RPM and 200° C.

| | Parts by Weight | |
|---|---|---|
| | Test 1 | Test 2 |
| Copolymer of ethylene and hydroxypropyl acrylate at 5% by weight (melt index = 24) | 99.2 | — |
| Copolymer of ethylene and hydroxyethyl methacrylate at 5% by weight (MI = 10) | — | 99.2 |
| Dibutyltin maleate (DBTM) | 0.5 | 0.5 |
| Antioxidant (Irganox 1010) | 0.3 | 0.3 |

The variations of the torque Nxm of mixing at that temperature are given in the following table:

| Tests | Time of mixing (min) | | | | | | | | | | | | |
|---|---|---|---|---|---|---|---|---|---|---|---|---|---|
| | 0 | 1 | 2 | 5 | 8 | 10 | 12 | 14 | 16 | 18 | 20 | 22 | 26 |
| 1 | 1.4 | 2.5 | 3.8 | 8 | 10.4 | 11.2 | 11.7 | 12.2 | 12.6 | 12.7 | 13.0 | 13.0 | 13.0 |
| 2 | 1.5 | 3.7 | 4.3 | 8.7 | 10.8 | 11.5 | 12.0 | 12.3 | 12.5 | 12.7 | 13.3 | 13.7 | 15.0 |

EXAMPLE 13

The compositions of Tests 1 and 2 of Example 12 are used and mixed under nitrogen in the BRABENDER blender at 130° C. and at 50 RPM for 10 min. By compression under 250 bars at 130° C., plates of 1 mm thickness are prepared which are kept in a drying oven at 100° C. for 8 hours. For the sake of comparison, the same test is carried out with a copolymer free of DBTM. The measurement of the gel ratio as well as the mechanical properties are indicated in the table which follows:

| Tests | TENSILE STRENGTH | | | Gel ratio % |
|---|---|---|---|---|
| | Tensile at yield value (MPa) | Breaking strength (MPa) | Elongation at break % | |
| Comparative | * | * | * | 0 |
| 1 | 12 | 10 | 80 | 31 |
| 2 | 12 | 10 | 80 | 15 |

*not determinable

EXAMPLE 14

In the BRABENDER blender of Example 12, mixtures 1, 2, 3, 4 are mixed at 200° C. under nitrogen at 30 RPM.

| | Parts by Weight | | | |
|---|---|---|---|---|
| | Test 1 | Test 2 | Test 3 | Test 4 |
| Copolymer of ethylene and hydroxyethyl acrylate at 2% by weight | 100 | 100 | 100 | 100 |
| Tetrabutylorthotitanate | 3.1 | 1.01 | 1.01 | 0.81 |
| Antioxidant (Santonox R) | 0.2 | 0.2 | 0 | 0.2 |

The variation in the torque Nxm of mixing at that temperature are given in the following table:

| Tests | Time of mixing (min) | | | | | | | | | | |
|---|---|---|---|---|---|---|---|---|---|---|---|
| | 0 | 1 | 1.5 | 5 | 10 | 14 | 20 | 26 | 36 | 42 | 46 |
| 1 | 3.75 | 7.05 | 10.0 | (dusting at 1.5 min) | | | | | | | |
| 2 | 4.10 | 5.70 | 6.20 | 8.10 | 8.40 | 9.00 | 10.00 | 10.60 | 11.30 | 11.20 | 11.40 |
| 3 | 3.70 | 5.75 | 6.60 | 7.95 | 8.80 | 9.60 | 10.80 | 11.60 | 11.60 | 11.50 | 11.60 |
| 4 | 4.10 | 5.55 | 6.05 | 8.65 | 9.30 | 10.10 | 11.00 | 11.30 | 11.00 | — | — |

EXAMPLE 15

Example 14 is again followed, but with the following composition:

| Copolymer of ethylene and hydroxyethyl acrylate at 2% by weight | 100 |
|---|---|
| Tetraisopropylorthotitanate | 1.01 |
| Antioxidant (Santonox R) | 0.2 |

Variations of the mixing torque at 200° C.:

| Time of mixing (mm) | 0 | 1 | 2 | 5 | 10 | 14 | 26 | 36 | 42 |
|---|---|---|---|---|---|---|---|---|---|
| Torque (Nxm) | 4.10 | 6.80 | 8.80 | 11.30 | 12.30 | 12.40 | 12.35 | 12.65 | 12.70 |

EXAMPLE 16

Under the conditions of Example 12, the following formulations are mixed at 50 RPM, under nitrogen, at 200° C.:

| | Parts by Weight | | |
|---|---|---|---|
| | Test 1 | Test 2 | Test 3 |
| Copolymer of ethylene and vinyl acetate at 18% by weight (melt index = 140) | 100 | — | — |
| Copolymer of ethylene and vinyl acetate at 18% by weight and hydroxyethyl acrylate at 5% by weight | — | 100 | — |
| Copolymer of ethylene and hydroxyethyl acrylate at 5% | — | — | 100 |
| DBTM | 0.5 | 0.5 | 0.5 |
| Antioxidant (Santonox R) | 0.2 | 0.2 | 0.2 |

The variations of the torque Nxm of mixing at 200° C. are indicated in the following table:

| Tests | Time of mixing (min) | | | | | | | | | |
|---|---|---|---|---|---|---|---|---|---|---|
| | 0 | 1 | 2 | 4 | 8 | 10 | 20 | 26 | 32 | 38 |
| 1 | 0.30 | 0.35 | — | — | — | — | — | — | — | 0.35 |
| 2 | 2.40 | 3.15 | 4.30 | 5.60 | 5.90 | dusting | | | | |
| 3 | 2.40 | 3.20 | 4.75 | 5.40 | 6.45 | 7.35 | 10.70 | 12.05 | 12.05 | 12.25 dusting |

The presence of vinyl acetate accelerates the kinetics of cross-linking.

EXAMPLE 17

In the blender of Example 12, the following formulations are mixed at 50 RPM, under nitrogen, at 200° C.:

|  | Parts by Weight | | | |
| --- | --- | --- | --- | --- |
|  | Test 1 | Test 2 | Test 3 | Test 4 |
| Copolymer of ethylene and vinyl acetate at 18% by weight (melt index = 2) | 100 | — | — | — |
| Copolymer of ethylene and vinyl acetate at 15.7% by weight and hydroxyethyl acrylate at 5% by weight (MI = 2.9) | — | 100 | — | — |
| Copolymer of ethylene and vinyl acetate at 21% by weight and hydroxyethyl acrylate at 5% by weight (MI = 13.2) | — | — | 100 | — |
| Copolymer of ethylene and hydroxyethyl acrylate at 4.5% by weight (MI = 5.8) | — | — | — | 100 |
| DBTM | 1 | 1 | 1 | 1 |
| Antioxidant (Santonox R) | 0.2 | 0.2 | 0.2 | 0.2 |

The variations of the torque Nxm of mixing at 200° C. are indicated in the following table:

| Tests | Time of mixing (min) | | | | | | | | | | | |
| --- | --- | --- | --- | --- | --- | --- | --- | --- | --- | --- | --- | --- |
|  | 0 | 1 | 2 | 3 | 8 | 10 | 16 | 20 | 26 | 32 | 38 | 40 |
| 1 | 3.25 | 0.80 | 3.15 | 3.60 | 3.60 | 3.70 | 3.80 | 3.85 | 3.90 | 4.00 | 4.15 | 4.15 |
| 2 | 3.25 | 4.25 | 8.85 | 11.75 | (dusting) | | | | | | | |
| 3 | 1.50 | 2.30 | 6.40 | 12.30 | (dusting) | | | | | | | |
| 4 | 2.30 | 3.00 | 5.00 | 6.70 | 9.90 | 10.50 | (dusting at 11 min) | | | | | |

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A process for cross-linking a copolymer consisting essentially of about 60 to 99.5% by weight of ethylene or of a mixture of ethylene with up to an equal part by weight of another ethylenically unsaturated monomer and about 0.5 to 40% by weight of a hydroxyalkyl ester comprising reacting in the absence of solvent said copolymer with about 0.5 to 5% by weight, based on the weight of said copolymer of an organometallic compound of a metal of Group IVA or IVB of the Periodic Table for a time at a temperature between about ambient temperature and 300° C. sufficient to effect cross-linking.

2. The process of claim 1 wherein the organometallic compound is a lead, tin, or titanium salt of an organic acid.

3. The process of claim 2 wherein said organic acid contains up to 25 carbon atoms.

4. The process of claim 3 wherein the organometallic compound is selected from dibutyltin diacetate, dibutyltin dilaurate, lead octoate, lead stearate, or tin stearate.

5. The process of claim 3 wherein the organometallic compound is a titanium compound of the formula Ti(OH$_2$)$_4$, in which the radicals R can be the same or different and are hydrogen or a hydrocarbon radical containing from 1 to 18 hydrocarbons.

6. The process of claim 1, 2, 3, 4, or 5 wherein the copolymer consists of ethylene and a hydroxyalkyl acrylate or hydroxyalkyl methacrylate.

7. The process of claim 1, 2, 3, 4, or 5 wherein the copolymer also contains a third polymerizable ethylenicly unsaturated monomer.

8. The process of claim 1, 2, 3, 4, or 5 wherein the copolymer also contains vinyl acetate or ethyl acrylate.

* * * * *